(12) United States Patent
Billau et al.

(10) Patent No.: US 10,778,802 B2
(45) Date of Patent: Sep. 15, 2020

(54) MOBILE DEVICE IDENTIFICATION

(71) Applicant: HCL Technologies Limited, New Delhi (IN)

(72) Inventors: Michael R. Billau, Durham, NC (US); John K. Gerken, III, Apex, NC (US); Jeremy A. Greenberger, Raleigh, NC (US); Ciaran E. Hannigan, Morrisville, NC (US)

(73) Assignee: HCL Technologies Limited, New Delhi (IN)

( * ) Notice: Subject to any disclaimer, the term of this patent is extended or adjusted under 35 U.S.C. 154(b) by 26 days.

(21) Appl. No.: 16/117,145

(22) Filed: Aug. 30, 2018

(65) Prior Publication Data

US 2018/0375954 A1 Dec. 27, 2018

Related U.S. Application Data

(60) Continuation of application No. 15/850,987, filed on Dec. 21, 2017, now Pat. No. 10,230,814, which is a
(Continued)

(51) Int. Cl.
*H04L 12/26* (2006.01)
*H04L 29/08* (2006.01)
(Continued)

(52) U.S. Cl.
CPC ....... *H04L 67/303* (2013.01); *G06Q 30/0207* (2013.01); *H04L 61/6022* (2013.01); *H04L 67/22* (2013.01)

(58) Field of Classification Search
CPC .... H04W 24/00; H04L 43/50; H04L 43/0852; H04L 43/08; H04B 17/003
See application file for complete search history.

(56) References Cited

U.S. PATENT DOCUMENTS 8,910,036 B1 12/2014 Cromwell
9,501,777 B1 11/2016 Hanyang
(Continued)

FOREIGN PATENT DOCUMENTS

EP 1475937 11/2004
GB 2480248 11/2011
WO WO 2014105180 7/2014

OTHER PUBLICATIONS

Bojinov, Hristo, et al. "Mobile Device Identification via sensor fingerprinting."arXiv preprint arXiv:1408. 1416 (2014).
(Continued)

*Primary Examiner* — Siren Wei
(74) *Attorney, Agent, or Firm* — Brooks Kushman P.C.

(57) ABSTRACT

Methods, computer program products, and systems are presented. The method computer program products, and systems can include, for instance: generating a first mobile device fingerprint of a mobile device and associating the first mobile device fingerprint to an identifier, and generating a second mobile device fingerprint of the mobile device and associating the second mobile device fingerprint to a MAC address of a mobile device. The methods, computer program products, and systems can include, for instance: receiving a first mobile device fingerprint of a mobile device and an identifier associated to the first mobile device fingerprint; receiving a second mobile device fingerprint of the mobile device and a MAC address associated to the second mobile device fingerprint; and associating received data received from the mobile device to the identifier.

12 Claims, 8 Drawing Sheets

Related U.S. Application Data division of application No. 15/294,021, filed on Oct. 14, 2016, now Pat. No. 9,948,744.

(51) Int. Cl.
*H04L 29/12* (2006.01)
*G06Q 30/02* (2012.01)

(56) References Cited

U.S. PATENT DOCUMENTS

| | | |
|---|---|---|
| 2006/0104233 A1 | 5/2006 | Zhang |
| 2008/0104689 A1* | 5/2008 | Hietasarka ........ H04L 29/12066 726/13 |
| 2010/0332400 A1* | 12/2010 | Etchegoyen ............ G06F 21/32 705/75 |
| 2011/0288940 A1 | 11/2011 | Horadan |
| 2012/0066767 A1* | 3/2012 | Vimpari ................ H04L 9/0866 726/26 |
| 2012/0323694 A1 | 12/2012 | Lita et al. |
| 2013/0044760 A1* | 2/2013 | Harjanto ................. H04L 67/14 370/401 |
| 2013/0097008 A1 | 4/2013 | Kaniel |
| 2013/0189953 A1* | 7/2013 | Mathews .............. H04W 12/06 455/411 |
| 2014/0365304 A1 | 12/2014 | Showers et al. |
| 2015/0006384 A1 | 1/2015 | Shaikh et al. |
| 2015/0235161 A1* | 8/2015 | Azar ............. G06Q 10/063114 705/7.15 |
| 2017/0076007 A1 | 3/2017 | Knoll |

OTHER PUBLICATIONS

Schuch, Alexander, et al: "A Method for Mobile Download Conversion Rate Measurement Based on Device Fingerprinting."Proceedings of ACM, 2013.

Peter Mell et al., "The NIST Definition of Cloud Computing", National Institute of Standards and Technology, U.S. Department of Commerce, NIST Special Publication 800-145, Sep. 2011, 7 pages.

List of IBM Patent and/or Patent Applications Treated as Related, Aug. 30, 2018, 2 pages.

* cited by examiner

MOBILE DEVICE IDENTIFICATION

CROSS-REFERENCE TO RELATED APPLICATION

This application is a continuation of U.S. patent application Ser. No. 15/850,987, filed Dec. 21, 2017, entitled, "Mobile Device Identification," which is incorporated by reference herein in its entirety, which is a divisional of U.S. patent application Ser. No. 15/294,021, filed Oct. 14, 2016, entitled, "Mobile Device Identification," which is incorporated by reference herein in its entirety.

TECHNICAL FIELD

The present disclosure relates to a mobile device in general and specifically to mobile device identification.

BACKGROUND

Mobile device positioning systems have been proposed which employ use of IEEE 802.11 ("Wi-Fi") radio transceivers. Wi-Fi positioning systems (WPS) have been proposed where the Global Positioning System (GPS) are inadequate due to various causes including multipath and signal blockage indoors. Wi-Fi positioning takes advantage of the availability of wireless access points.

Proposed positioning techniques employing wireless access points have included techniques based on measuring the intensity of the received signal (received signal strength indication or RSSI). Typical parameters useful to geolocate the Wi-Fi hotspot or wireless access point include an access point's SSID and MAC address. Accuracy can depend on the number of positions that have been collected. A Wi-Fi hotspot database can include data correlating mobile device GPS location data with Wi-Fi hotspot MAC addresses.

Positioning techniques using one way communication short range radio signal beacons have been proposed. According to one technique a short range radio signal beacon can be disposed at a predetermined location. Receipt of the short range radio signal by a mobile device indicates that the mobile device is at a location proximate the beacon.

SUMMARY

Shortcomings of the prior art are overcome, and additional advantages are provided, through the provision, in one aspect, of a method. The method can include, for example: generating a first mobile device fingerprint of a mobile device using a first mobile device fingerprint generating process and associating the first mobile device fingerprint to an identifier, and generating a second mobile device fingerprint of the mobile device using a second mobile device fingerprint generating process and associating the second mobile device fingerprint to a MAC address of the mobile device.

In another aspect, a computer program product can be provided. The computer program product can include a computer readable storage medium readable by one or more processing unit and storing instructions for execution by one or more processor for performing a method. The method can include, for example: generating a first mobile device fingerprint of a mobile device using a first mobile device fingerprint generating process and associating the first mobile device fingerprint to an identifier, and generating a second mobile device fingerprint of the mobile device using a second mobile device fingerprint generating process and associating the second mobile device fingerprint to aa MAC address of the mobile device.

In a further aspect, a system can be provided. The system can include, for example a memory. In addition, the system can include one or more processor in communication with the memory. Further, the system can include program instructions executable by the one or more processor via the memory to perform a method. The method can include, for example: generating a first mobile device fingerprint of a mobile device using a first mobile device fingerprint generating process and associating the first mobile device fingerprint to an identifier, and generating a second mobile device fingerprint of the mobile device using a second mobile device fingerprint generating process and associating the second mobile device fingerprint to aa MAC address of the mobile device.

In another aspect, a method can be provided. The method can include for example: receiving a first mobile device fingerprint of a mobile device and an identifier associated to the first mobile device fingerprint; receiving a second mobile device fingerprint of the mobile device and a MAC address associated to the second mobile device fingerprint; and associating received data received from the mobile device to the identifier, the associating including using the first mobile device fingerprint and the second mobile device fingerprint.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
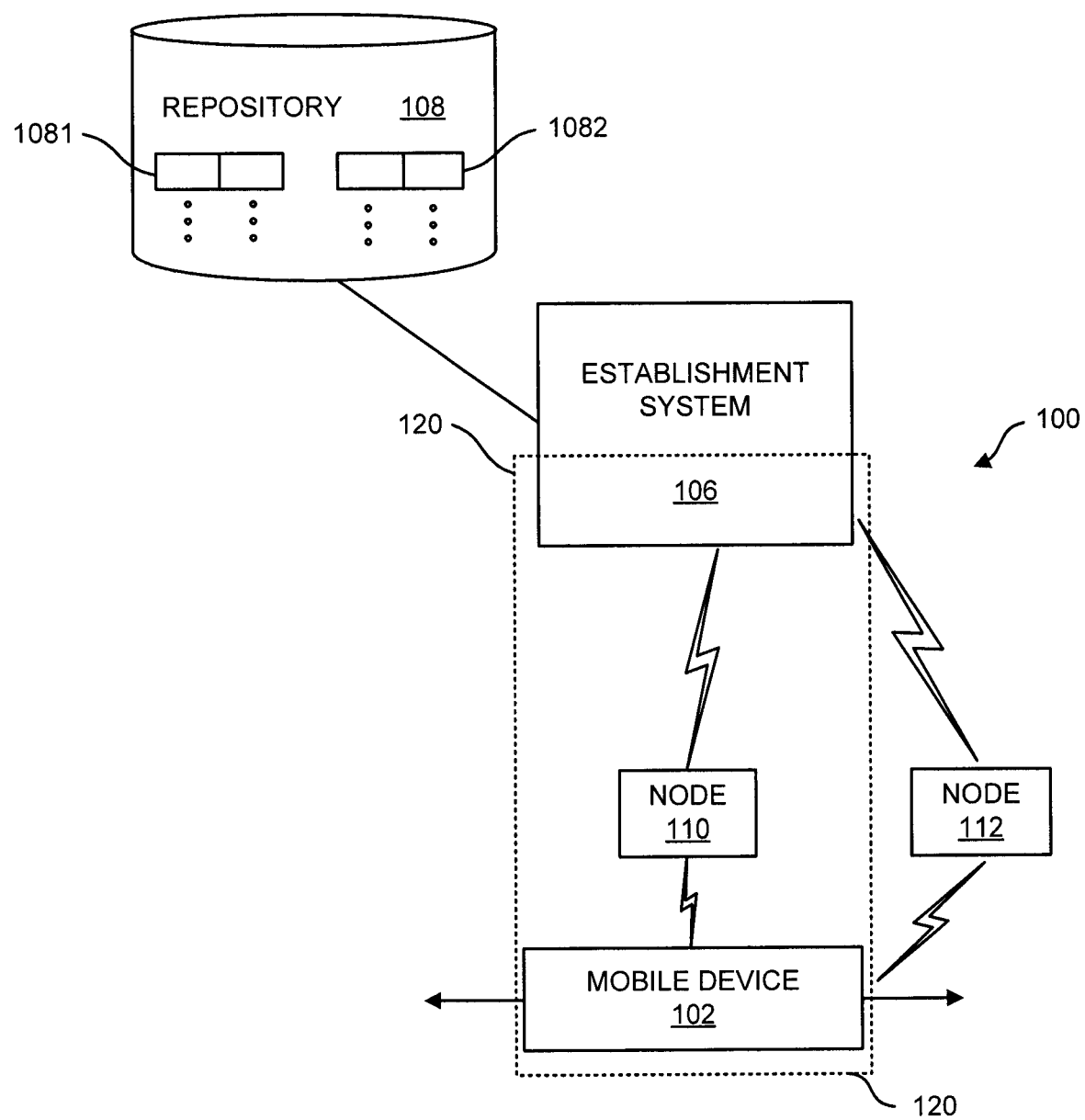
FIG. 1 depicts a system having a mobile device and an establishment system according to one embodiment.

An overview of a system 100 is shown in FIG. 1. System 100 can include one or more mobile device 102 and establishment system 106 having an associated data repository 108. System 100 can also include connection node 110 and connection node 112. In one embodiment, connection node 110 operates in accordance with a first wireless communication protocol and one or more connection node 112 operates in accordance with a second wireless communication protocol. In one embodiment, connection node 110 can be configured in accordance with a wireless local area network (LAN) communication protocol and connection node 112 can be configured in accordance with a wireless wide area network (WAN) communication protocol. Data repository 108 in one embodiment can include first and second tables 1081 and 1082.

Border 120 indicates a region of an establishment such as a retail store or an entertainment center. Establishment system 106 can be located external to a region indicated by border 120 internal to a region or partially internal to a region indicated by border 120 and partially external from (e.g. remote from) a region indicated by border 120. In one embodiment, a common organizational entity, e.g. a retailer, an event center operator can provide establishment system 106, the establishment having a region delimited by border 120, connection node 110 within a region indicated by border 120 as well as one or more application (which in one embodiment can be referred to as an "establishment application") running on mobile device 102. Establishment system 106 in one embodiment can be a computing node based system operated by an organizational entry, e.g. a retailer, an event center operator.

Figure 6:
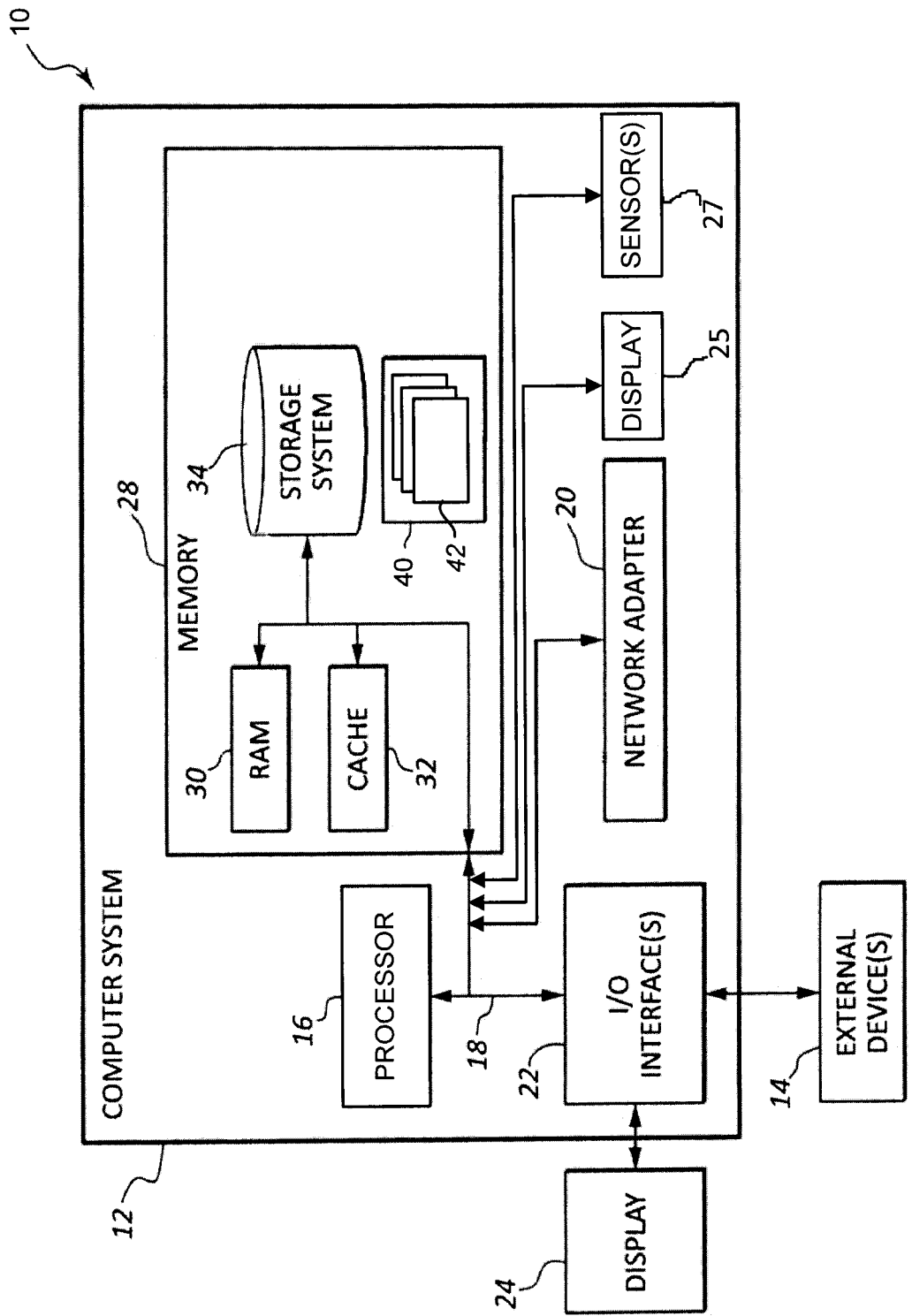
FIG. 6 depicts a computing node according to one embodiment.

In one embodiment, each of mobile device establishment system 106 connection node 110 and connection node 112 can include one or more computing node 10 as set forth herein in connection with FIG. 6. Embodiments herein recognize that addresses for network interface devices i.e. MAC addresses may not be available to applications running on mobile devices such as mobile device 102. For example, MAC addresses are generally not available to applications running on the iOS operating system available from Apple Inc. or ANDROID developed Google Inc. Embodiments herein recognize that it may be useful to associate data received from a mobile device 102 to an identifier, such as an identifier of a certain user, e.g. a user identification number or application serial number associated to a user identification number. Embodiments herein recognize that associating received data from mobile device 102 to a certain user can facilitate various operations e.g. counting a number of users in an establishment, tracing a precise path of a certain user within an establishment. Embodiments herein recognize that associating received data from mobile device 102 to an identifier can facilitate operations such as messaging a user based on a user's location.

Embodiments herein recognize a particular problem with data association in the case data travels though different paths from a mobile device, such as mobile device 102, to establishment system 106. In one embodiment an establishment (e.g. a retailer or entertainment center operator) providing establishment system 106 can provide an establishment application running on mobile device 102 and can also provide connection node 110. According to one data path, data can travel from the establishment application to establishment system 106 via connection node 110. According to a second data path data can travel from a browser application to establishment system 106 via connection node 110. Embodiments herein recognize that data of such first and second data paths can be absent of data useful for indexing notwithstanding the first data path involving an establishment application provided by the same organizational entity providing establishment system 106 and the second data path involving an establishment connection node 110 provided by the same organizational entity providing establishment system 106.

A method 200 that can be performed using mobile device 102 is illustrated with reference to FIG. 2. In one embodiment method 200 can be performed by one or more program running on one or more processor of mobile device 102. At block 210 method 200 can include generating a first mobile device fingerprint of a mobile device using a first mobile device fingerprint generating process. At block 220 method 200 can include generating a second mobile device fingerprint of the mobile device using a second mobile device fingerprint generating process. In one embodiment method 200 can include at block 210 associating the first mobile device fingerprint to an identifier. In one embodiment method 200 can include at block 220 associating the second mobile device fingerprint of the mobile device to a MAC address.

In one embodiment, the first fingerprint generating process can be provided in a first application that provides the identifier and the second fingerprint generating process can be provided in a second application that provides the MAC address. In one embodiment the generating the first mobile device fingerprint can be responsively to installation of a first application wherein the first application is an establishment application provided by an entity that provides establishment system 106. In one embodiment the identifier can be an identifier of a certain user, e.g. a user identification number or application serial number associated to a user identification number. In one embodiment, the generating a second mobile device fingerprint can be responsive to running of a second application, the second application being a web browser.

Figure 2:
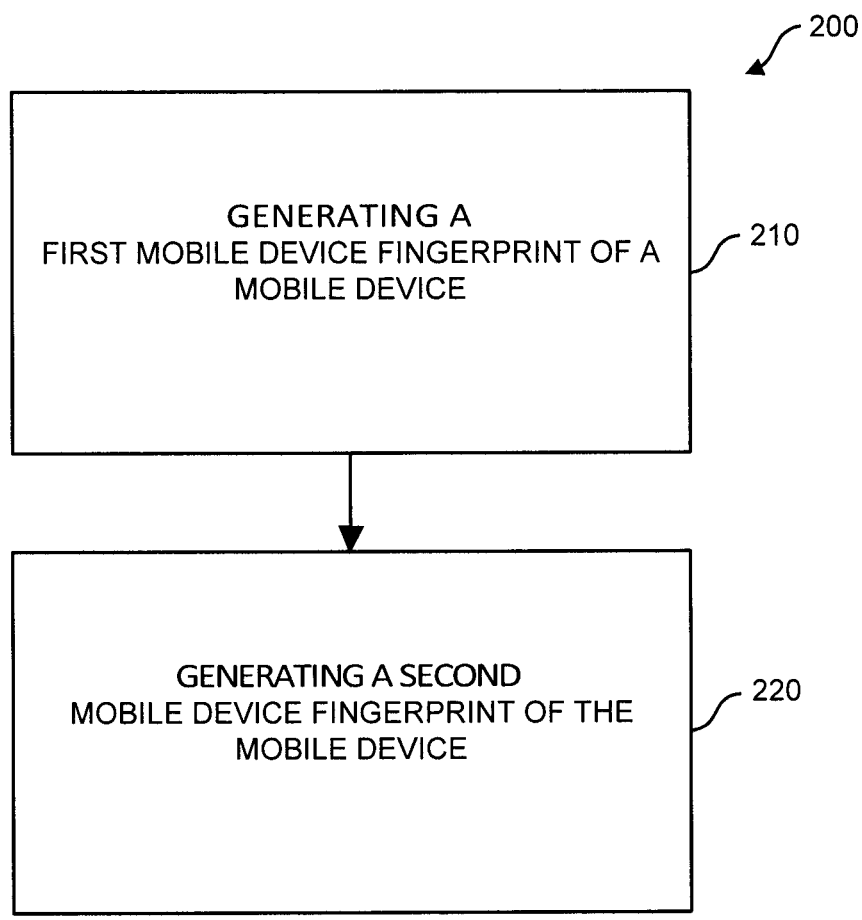
FIG. 2 depicts a flowchart illustrating method for use in device identification according to one embodiment.

In one embodiment in reference to method 200 as set forth in FIG. 2 associating at block 210 can include formatting and sending to establishment system 106 a message having the first mobile device fingerprint associated to an identifier. For example the first application can be an installed establishment application provided by the entity that maintains establishment system 106. Such establishment application can be e.g. a retail store (e.g. customer loyalty) application or entertainment center application. When installed, the establishment application can have an identifier e.g. provided by a user identifier. Mobile device 102 can be configured so that responsively to the first mobile device fingerprint being generated a message having the first mobile device fingerprint associated to the identifier can be sent to establishment system 106.

In one embodiment associating at block 220 of the second mobile device fingerprint and the MAC address can include formatting a message having the second mobile device fingerprint to include the MAC address. In one embodiment by formatting a message for sending to establishment system 106 having the second mobile device fingerprint according to the Internet Protocol (IP). In one embodiment a captive portal webpage that can be received by mobile device 102 can include mobile device fingerprint generating script code that can run in the second application provided by a web browser. Mobile device 102 can be configured so that responsively to the second mobile device fingerprint being generated, mobile device 102 can send a message having the second mobile device fingerprint of mobile device 102, and the MAC address for mobile device 102 associated thereto, to establishment system 106.

Figure 3:
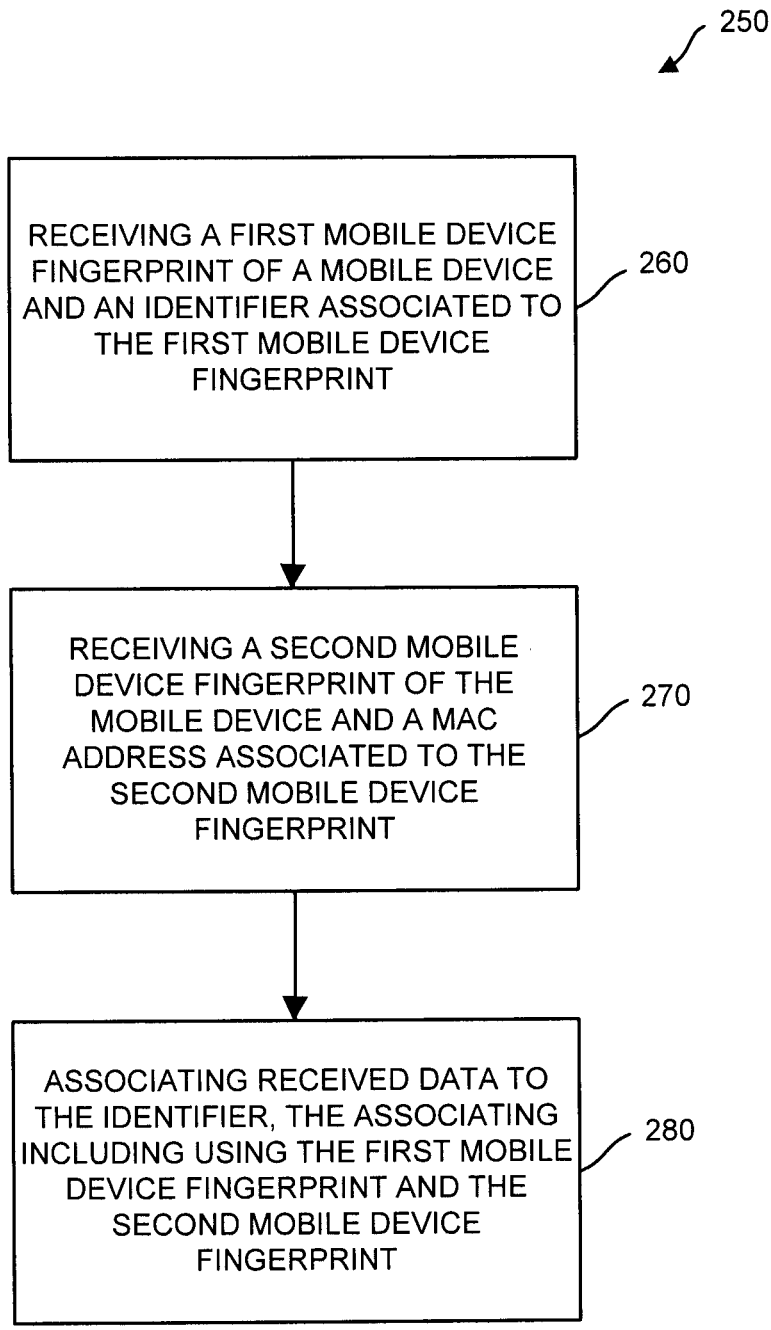
FIG. 3 is a flowchart depicting a method for use in device identification according one embodiment.

A method 250 that can be performed by establishment system 106 is shown in FIG. 3. In one embodiment method 250 can be performed by one or more program running on one or more processor of establishment system 106. Method 250 can include at block 260 receiving a first mobile device fingerprint of a mobile device and an identifier associated to the first mobile device fingerprint; at block 270 receiving a second mobile device fingerprint of the mobile device and a MAC address associated to the second mobile device fingerprint; and at block 280 associating received data received from the mobile device to the identifier, the associating including using the first mobile device fingerprint and the second mobile device fingerprint of the mobile device.

Figure 4:
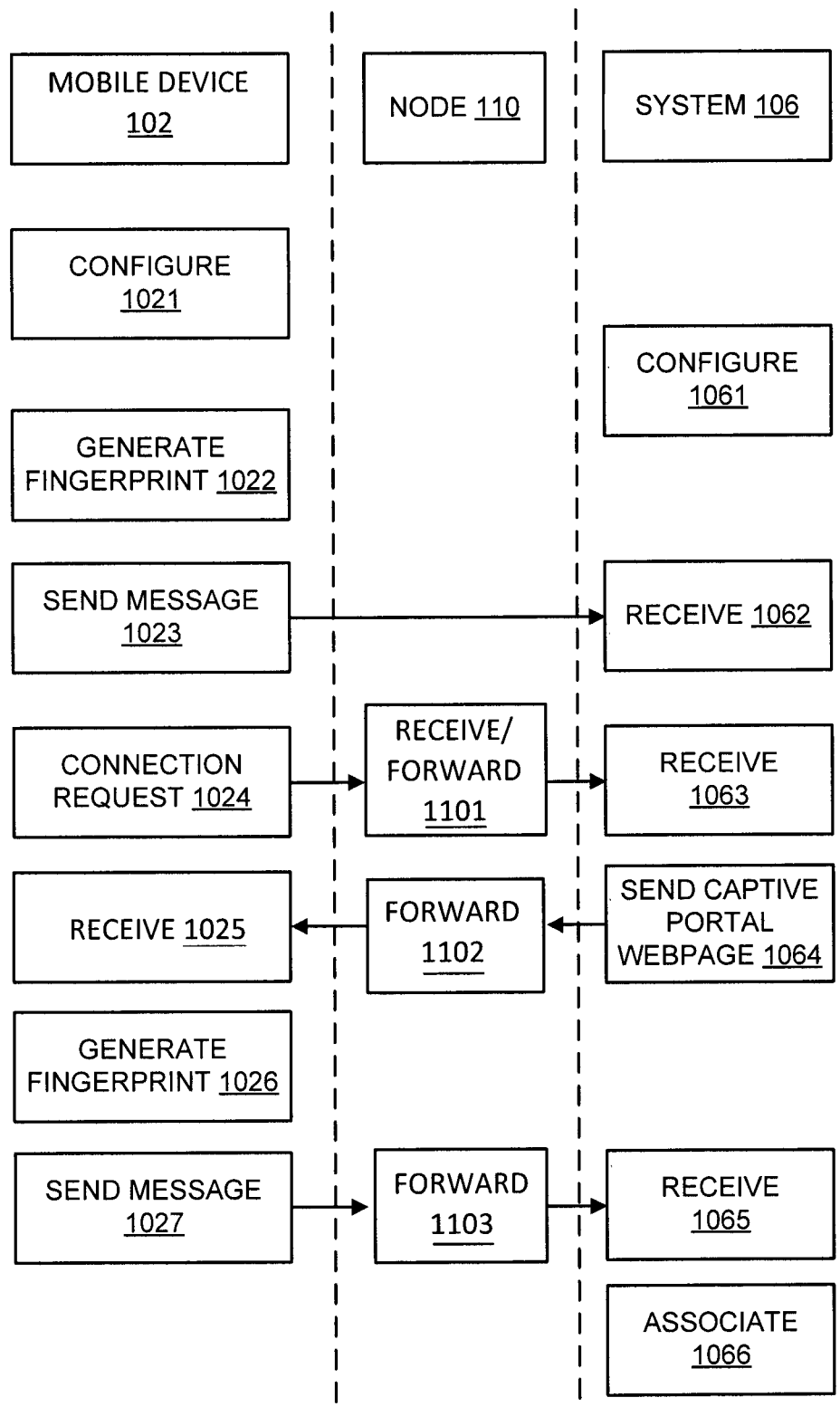
FIG. 4 depicts a flowchart for use in device identification according to one embodiment.

A flowchart illustrating in one embodiment operation of a mobile device externally to and within an establishment (e.g. such as a retail store or entertainment center) is shown in FIG. 4, wherein exemplary functions are described with respect to mobile device 102, connection node 110, and establishment system 106.

At block 1021 mobile device 102 can be configured to be operational in accordance with the functionalities described herein.

Figure 5:
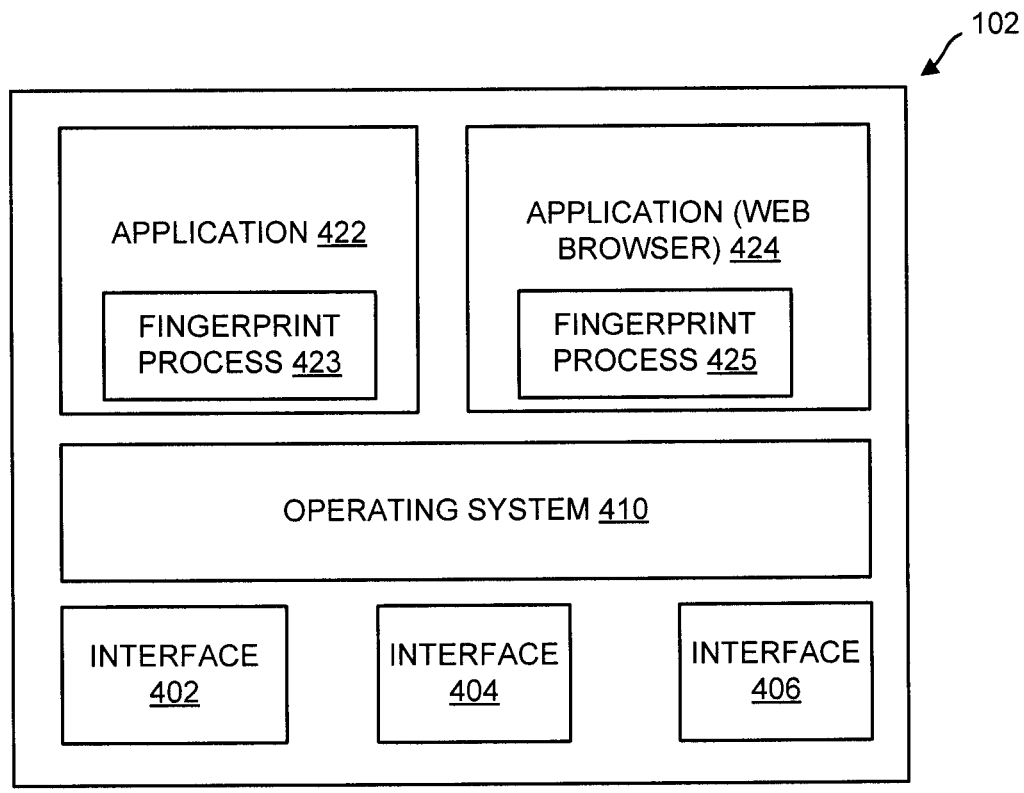
FIG. 5 depicts a mobile device schematic diagram according to one embodiment.

Configuration of mobile device 102 in one embodiment is described with reference to the schematic diagram of FIG. 5. Mobile device 102 can include first second and third network interfaces 402, 404, 406, operating system (OS) 410, and first and second applications 422, 424. In one embodiment, connection node 110 can be provided by an IEEE 802.11 access point and first network interface 402 can be an IEEE 802.11 network interface for communication with connection node 110. In one embodiment second network interface device 404 can be e.g. a cellular network interface for communication with connection node 112, and third network interface 406 can be e.g. a network interface for communication e.g. with a Bluetooth compliant network. Each network interface 402, 404, 406 can include a MAC address that can be used for identification of mobile device 102.

In one embodiment, first application 422 can be an application provided by an organizational entity that provides establishment system 106. First application 422 in one embodiment can be e.g. a retailer-specific application such a customer loyalty application and application 424 can be web browser. First application 422 can include fingerprint generating process 423 and second application 424 can include fingerprint generating process 425. First application 422 in one embodiment can be a customer loyalty application that facilitates online shopping by a user, and/or which allows a user to enter user profile data, and/or which allows a user to receive messages having live promotions including in establishment promotions. In one embodiment e.g. where provided by an organizational entity that provides establishment system 106, application 422 can be regarded as an establishment application.

For configuring mobile device 102 to determine a fingerprint identifier for a certain mobile device, application 422 when installed on mobile device 102 can include mobile device fingerprint generating process 423. In one embodiment, for establishing the fingerprint generating process 423 in application 422 mobile device 102 can be configured to run a marked up content (e.g. HTML, XML) rendering engine. In one embodiment, for establishing the fingerprint generating process 425 in application 424 mobile device 102 can be configured so that application 424 can be provided by a web browser application and can be configured to run a marked up content (e.g. HTML, XML) rendering engine of the browser application. Embodiments herein recognize that a marked up content rendering engine running in application 422 can simulate an attributes scan performed by a marked up content rendering engine of a typical web browser application. In one embodiment the second fingerprint generating process 425 can be a fingerprint process in common with the first fingerprint generating process 423 and in one embodiment the second fingerprint generating process 425 can be different from the first fingerprint generating process 423, e.g., can use a different marked-up content rendering engine. In one embodiment a second mobile device fingerprint generated by a second fingerprint generating process 425 and a first mobile device fingerprint generated by a first fingerprint generating process 423 can be identical to one another and in one embodiment a second mobile device fingerprint generated by a second fingerprint generating process 425 and a first mobile device fingerprint generated by a first fingerprint generating process 423 can be different and not identical to one another.

A marked up content rendering engine can be implemented with use of script code, e.g. a JavaScript runtime. In one embodiment, running the mobile device fingerprint generating process 423 can include running a marked up content rendering engine to perform hashing a collection of non-private attributes of mobile device 102 that are available to the application 422 when the fingerprint generating process 423 is run. In one embodiment, a marked up content rendering engine can be provided by a WEBVIEW function of the APACHE CORDOVA application development framework.

As noted, application 422 can be an establishment application, e.g. an application provided by an organizational entity providing establishment system 106. In one embodiment, application 422 can be subscription based application and can require that a user present a user identification for installing application 422 on mobile device 102. In one embodiment, application 422 can include an identifier, e.g. a user identifier such as a user identification number or an application serial number associated to the user. Inclusion of fingerprint generating process 423 in application 422 can facilitate associating of a generated mobile fingerprint and data of the application, e.g. an identifier.

At block 1061 establishment system 106 can be configured to be operational in accordance with the functionalities described herein. For configuration of establishment system 106 establishment system 106 can be configured to act as a captive portal and during a connection establishing process can be configured to serve captive portal webpages to connecting mobile devices connecting with system 106 via connection node 110. Establishment system 106 can be configured to capture MAC addresses of connecting mobile devices connecting thereto via connection node 110 during the connection establishing process. In one embodiment, establishment system 106 can be configured so that captive portal webpages that are served can include mobile device fingerprint generating script code that configures a mobile device receiving the script code to provide mobile device fingerprint generating process 425 when run by web browser application of mobile device 102 that receives the script code. In response to receipt of fingerprint generating script code included in a captive portal webpage being received, application 424 which can be provided by a web browser application can run the script code to generate a mobile device fingerprint. In one embodiment, the mobile device fingerprint generating process 425 can be performed by hashing a collection of non-private attributes of mobile device 102 that are available to application 424 which can be provided by a web browser application when the fingerprint generating process 425 is run. In one embodiment, for establishing the fingerprint generating process 425 in application 424 mobile device 102 can be configured so that application 424 can be provided by a web browser application that includes a marked up content (e.g. HTML, XML) rendering engine. System 100 can be configured so that received script code from a captive portal webpage as set forth herein runs a marked up content rendering engine of application 424 which can be provided by a web browser application to perform an attributes scan of mobile device 102. Embodiments herein recognize that a marked up content rendering engine running in application 422 can simulate an attributes scan performed by a marked up content rendering engine of a typical web browser application.

System 100 can be configured so that during a connection establishment process in which a MAC address sent from a connecting mobile device 102 is received by establishment system 106 application 424 which can be a web browser application running fingerprint generating process 425 can generate the second mobile device fingerprint and send the second mobile device fingerprint of mobile device 102 to establishment system 106. For associating a second mobile device fingerprint of mobile device 102 to a MAC address for mobile device 102 in one embodiment, mobile device 102 can format a message having the second fingerprint according to the Internet Protocol (IP) so that a MAC address of the transmitting node mobile device 102 is included in a packet frame of the message. On a message receiving end establishment system 106 can query the message to determine the MAC address.

Blocks 1022-1026, 1101-1103, and 1062-1066 refer to exemplary interactions of mobile device 102 with connection nodes 110, 112 and establishment system 106 when mobile device 102 is deployed in use.

At block 1022 application 122 can be activated and fingerprint generating process 423 can be run. In response to fingerprint generating process being run, a mobile device fingerprint can be generated.

Mobile device 102 can be configured so that responsively to application 422 generating a mobile device fingerprint, application 422 can at block 1023 send a message to establishment system 106. The message can include the mobile device fingerprint associated with an identifier e.g. a user identifier included in the application 422. The identifier in one embodiment can be data stored on mobile device 102 as data of application 422. The identifier in one embodiment can be determined by querying application data of application 422 stored on mobile device 102. In one embodiment, each of the mobile device fingerprint and the identifier can be formatted as payload data the message sent at block 1023. In one embodiment, application 422 can be configured to run application 422 and fingerprint generating process 423 and to send the message at block 1023 responsively to being installed on mobile device 102. The message sent at block 1023 and received at block 1062 can include in principle any data path e.g. in one embodiment a data path having connection node 112 but not having connection node 110, and in another embodiment can include a data path having connection node 110 but not having connection node 112.

At block 1062 establishment system 106 can receive the message sent at block 1023 and in response can store in data repository 108 a record of the mobile device fingerprint associated to an identifier e.g. a user identifier for application 422. Subsequent messages sent by application 422 and received by establishment system 106 that include the identifier, e.g. a user identifier of the user of application 422 can be absent the generated mobile device fingerprint generated at block 1022 but nevertheless can be referenced to the first mobile device fingerprint by the storing of the record at block 1062.

As mobile device 102 is carried about an establishment having a region indicated by border 120 (FIG. 1) mobile device 102 may come in communication range of a connection node 110 within the region operating in accordance with a certain wireless communication protocols, e.g. IEEE 802.11. At block 1024, in the exemplary scenario depicted in FIG. 4, mobile device 102 can enter connection range of connection node 112 provided by e.g. an IEEE 802.11 access point and can send a request to connect received by connection node 110 at block 1101. A connection request can include a message having a packet frame with a MAC address of the mobile device 102. A connection request can include e.g. one or more of a probe request, authentication frame, or an association request in the case connection node 110.

Responsively to a connection request being received at block 1063 establishment system 106 at block 1064 can send via connection node 110 a captive portal webpage for receipt by mobile device 102 in accordance with a configuration process set forth at block 1061. The received captive portal webpage, which can be forwarded by connection node 110 at block 1102 and received by mobile device 102 at block 1025, can include mobile device fingerprint generating script code that can be received by mobile device 102 to configure mobile device 102 to include fingerprint generating process 425. A mobile device 102 receiving the captive portal webpage can run fingerprint generating script code included in the captive portal webpage to generate the second mobile device fingerprint of the mobile device 102. At block 1026 application 424 which can be a web browser application of mobile device 102 can run the script code defining fingerprint generating process 425 to generate a second mobile device fingerprint. In one embodiment, the mobile device fingerprint generating process 425 can be performed by hashing a collection of non-private attributes of mobile device 102 that are available to application 424 which can be provided by a web browser application when the fingerprint generating process 425 is run. In one embodiment, script code received from a captive portal webpage can include script code to run a marked up content rendering engine of application 424 that can be provided by a web browser application. System 100 can be configured so that received script code from a captive portal webpage as set forth herein runs a marked up content rendering engine of application 424 to perform an attributes scan of mobile device 102.

At block 1027 mobile device 102 can send a message to establishment system 106 via connection node 110 provided e.g. by an IEEE 802.11 access point. The message sent at block 1027, which can be forwarded to establishment system 106 by connection node 110 at block 1103, can include the second mobile device fingerprint for mobile device 102 generated at block 1026 associated to a MAC address for mobile device 102. For associating the second mobile device fingerprint of mobile device 102 to a MAC address for mobile device, mobile device 102 can format the message for sending at block 1027 in accordance with the Internet Protocol (IP) as set forth herein. Alternatively or additionally for associating the second mobile device fingerprint of mobile device 102 to a MAC address of mobile device 102, mobile device 102 can send the second mobile device fingerprint and MAC address to establishment system 106 with one or more message that include a common timing (e.g. are within a threshold range of times) and/or which are sent as part of a common network connection process. Such one or more message can be sent by mobile device 102 at one or more of blocks 1023 or block 1027 and can be received by establishment system 106 at one or more of block 1063 or block 1065.

At block 1065 establishment system 106 acting as a captive portal can receive via connection node 110 the message transmitted by application 424 of mobile device 102 at block 1027. At block 1065 establishment system 106 can query the message received at block 1065 to determine the MAC address of mobile device 102. At block 1065 establishment system 106 can store into data repository 108 a record of the second mobile device fingerprint of mobile device 102 associated to the MAC address for mobile device 102.

There is set forth herein a method wherein receiving a first mobile device fingerprint of a mobile device 102 and an identifier associated to the first mobile device fingerprint includes receiving a message having each of the first mobile device fingerprint and the identifier formatted as application layer payload data of the message (e.g. the message received at block 1063), and wherein the receiving a second mobile device of the mobile device and a MAC address associated to the second mobile device fingerprint includes receiving a received message (e.g. the message received at block 1065) having the second mobile device fingerprint formatted as application layer payload data of the received message and the MAC address formatted as frame data of the received message.

Subsequent data sent by mobile device 102 and received by establishment system 106 that include the MAC address of mobile device 102 can be absent the generated mobile device fingerprint generated at block 1026 but nevertheless can be referenced to the second mobile device fingerprint by the storing of the record into data repository 108 at block 1065. In one embodiment, a captive portal webpage sent at block 1064 can include a form for completion by a user, e.g. including Terms and Conditions for use of the network having connection node 110. A message sent by mobile device 102 at block 1027 can include data of a completed form in addition to the fingerprint generated at block 1026.

At block 1066 establishment system 106 can perform associating received data received from the mobile device 102 to the identifier sent at block 1023 and received at block 1062 using the first and second mobile device fingerprints of mobile device 102. It has been noted that at block 1062 establishment system 106 can receive a first mobile fingerprint for mobile device associated to an identifier, and that at block 1065 establishment system 106 can receive a second mobile device fingerprint for mobile associated to a MAC address for mobile device 102. In addition to being used for data association processes set forth herein the second mobile device fingerprint can be used by establishment system 106 for performing authentication of mobile device 102 for access to the network having connection node 110.

In one embodiment, performing associating of received data to an identifier at block 1066 can include identifying matching first and second mobile device fingerprints for mobile devices. Skilled artisans will recognize that as many mobile devices are introduced to system 100 many fingerprints according to the first mobile device fingerprint and many fingerprints according to the second mobile device fingerprint can be expected to be received by establishment system 106. Establishment system 106 can be operative to identify a first mobile device fingerprint and a second mobile device fingerprint generated by the same mobile device e.g. mobile device 102 as matching fingerprint. For performing matching establishment system 106 can employ one or more pattern recognition process, e.g. employing one or more of classification algorithms, clustering algorithms. In one aspect, establishment system 106 can be configured to apply a matching criteria so that while the first mobile device fingerprint for mobile device 102 and the second mobile device fingerprint for mobile device 102 may not be identical, the fingerprints can nevertheless be determined to be matching fingerprints according to the matching criteria applied by establishment system 106.

In one embodiment, performing associating of received data to an identifier at block 1066 can include table lookup and indexing. In one embodiment, establishment system 106 can (using messages such as the message sent at block 1023 from a plurality of different applications according to application 422 on different mobile devices) store a first table 1081 (FIG. 1) associating identifier e.g. user identifiers to first mobile device fingerprints and can also store (using messages such as the message sent at block 1027 from a plurality of different applications according to application 424 on different mobile devices) a second table 1082 (FIG. 2) associating MAC addresses to second mobile device fingerprints. Establishment system 106 can be operative to use mobile device fingerprints identified as matching mobile device fingerprints as indexes between the first and second tables 1081 and 1082. Accordingly, at block 1064 received data having an associated MAC address can be associated to a certain identifier, e.g. a user identifier indicating a user of application 422.

Advantages of such associating at block 1066 and further embodiments facilitated can be highlighted with reference to various exemplary scenarios.

Embodiments herein allow establishment system 106 to determine that a particular user has entered an establishment having a region defined by border 120. For example, in one embodiment of method 250 (FIG. 3), establishment system 106 can be configured to monitor MAC addresses received from mobile devices by an establishment connection node such as connection node 110. On receipt of each incoming MAC address establishment system 106 can query data repository 108 for identifiers associated to the MAC address. In one embodiment an identifier associated to a MAC address can be an identifier of a user. Accordingly, in one embodiment on determining that there is an associated identifier to a received MAC address establishment system 106 can determine that a particular user (and not merely an anonymous mobile device) has entered an establishment. In one embodiment, on determining that there is an identifier associated to a MAC address, establishment system 106 can determine that a particular user has entered an establishment and that the particular user having mobile device 102 is the same particular user for which establishment system 106 has stored in data repository 108 user profile data, including e.g., user profile data and/or purchase history data. In one embodiment, on determining that there is an identifier associated to a MAC address, establishment system 106 can determine that a particular user has entered an establishment and that the particular user having mobile device 102 is the same particular user who has used application 422 installed on mobile device 102 for one or more purpose, e.g. for online shopping, to enter use profile data, and/or to receive messages having promotions. In one embodiment method 250 can be operative so that responsively to an identifier associated to a received MAC address being identified, establishment system 106 can send a message to a mobile device. The message can be e.g. an in store promotion advising as to a promotion currently ongoing at the establishment. The message can be based on the identifier, e.g. can be sent to a destination (e.g. an application and/or a mobile device e.g. 102) associated to the identifier and/or can have content based on the identifier. In one embodiment, data repository 108 can include user profile data associated to identifiers where identifiers are user identifiers. User profile data can include e.g. user preference data and/or user purchase history data. In one embodiment content of a message sent to a mobile device responsively to an identifier associated to a MAC address being identified can include content based on user profile data associated to an identifier. For example establishment system 106 in response to identifying an identifier associated to a received MAC address can a send a message with content describing an in store promotion promoting sporting goods if user profile data (e.g. preference and/or purchase history data) associated to the identifier indicates that a user identified by the identifier is a sports enthusiast.

Embodiments herein recognize deficiencies with current platforms that use a current location of a user. In one conventional scenario for real time positioning of a user using an establishment application such as a customer loyalty application, an establishment application can detect that it is proximity of a beacon, which can be one of many beacons disposed in a region of an establishment. Embodiments herein recognize that such platforms are reliant on the positioning of such beacons and have limited resolution limited by the number of deployed beacons.

Embodiments herein can include functionality for granular high resolution positioning of users and interactive communications with users via an application 422 that can be an establishment application. In one embodiment multiple connection nodes configured according to connection node 110 can be disposed within an establishment region and indicated by border 120 and establishment system 106 can be configured to perform triangulation based positioning services based on signals received at the various connection nodes 110. In one embodiment establishment system 106 can record triangulation based positioning information for mobile device 102 over time that tracks a traveled path of mobile device 102 through an establishment having a region indicated by border 120. In one embodiment, establishment system 106 can incorporate locating services as are available from locating services systems integrators. According to one example locating services can be provided by GLOBAL TECHNOLOGY SERVICES® of International Business Machines Corporation based on the IBM PRESENCE INSIGHTS® locating services platform.

As set forth herein, embodiments herein facilitate associating received data having a certain MAC address associated thereto to a certain identifier. In one embodiment the received data can be signal data used for triangulation based positioning. Accordingly, high resolution positioning information over time of a mobile device 102 can be associated to an identifier e.g. a user identifier for user of application 422.

In one embodiment, establishment system 106 can be configured to enhance a user experience using high resolution positioning information of a mobile device 102 and an associated identifier. For example, establishment system 106 can be configured to send to application 422 of mobile device 102 a message responsive to a current position of a mobile device 102. For example, if a user is in a retail store establishment at a location of certain goods, establishment system 106 can send to application 422 running on mobile device 102 a message with promotion for certain goods. Application 422 can be configured to continually report its associated IP address to establishment system for facilitating messaging of application 422 of mobile device 102 by establishment system 106.

Establishment system 106 can alternatively or in addition send messages to application 422 running on mobile device 102 based on position over time tracking information of a mobile device 102. For example, if establishment system 106 in examining position tracking information determines that an of interest location of an establishment was not visited by the user of mobile device 102 establishment system 106 can send a message to application 422 running on mobile device 102 with a certain promotion to encourage visiting of the of interest location during a return of the user to the establishment.

Certain embodiments herein may offer various technical computing advantages, involving computing advantages to address problems arising in the realm of computer networks such as data association problems involving data sent from a mobile device to an establishment system but traveling along different paths, where a first data path can include a first application and a first network communication protocol, and a second path can include a second application and a second network communication protocol. In one embodiment a first mobile device fingerprint generating process can be performed to generate a first mobile device fingerprint of a mobile device by hashing a collection of non-private attributes that are available to an establishment application when the fingerprint generating process is run. In one embodiment a second mobile device fingerprint generating process can be performed to generate a second mobile device fingerprint of a mobile device by hashing a collection of non-private, attributes that are available to a web browser application when the second fingerprint generating process is run. In one embodiment, an establishment system can receive the first mobile device fingerprint associated to an identifier, receive the second mobile device fingerprint associated to a MAC address, and can perform associating of received data to the identifier using the first mobile device fingerprint of the mobile device and the second mobile device fingerprint of the mobile device.

Figure 7:
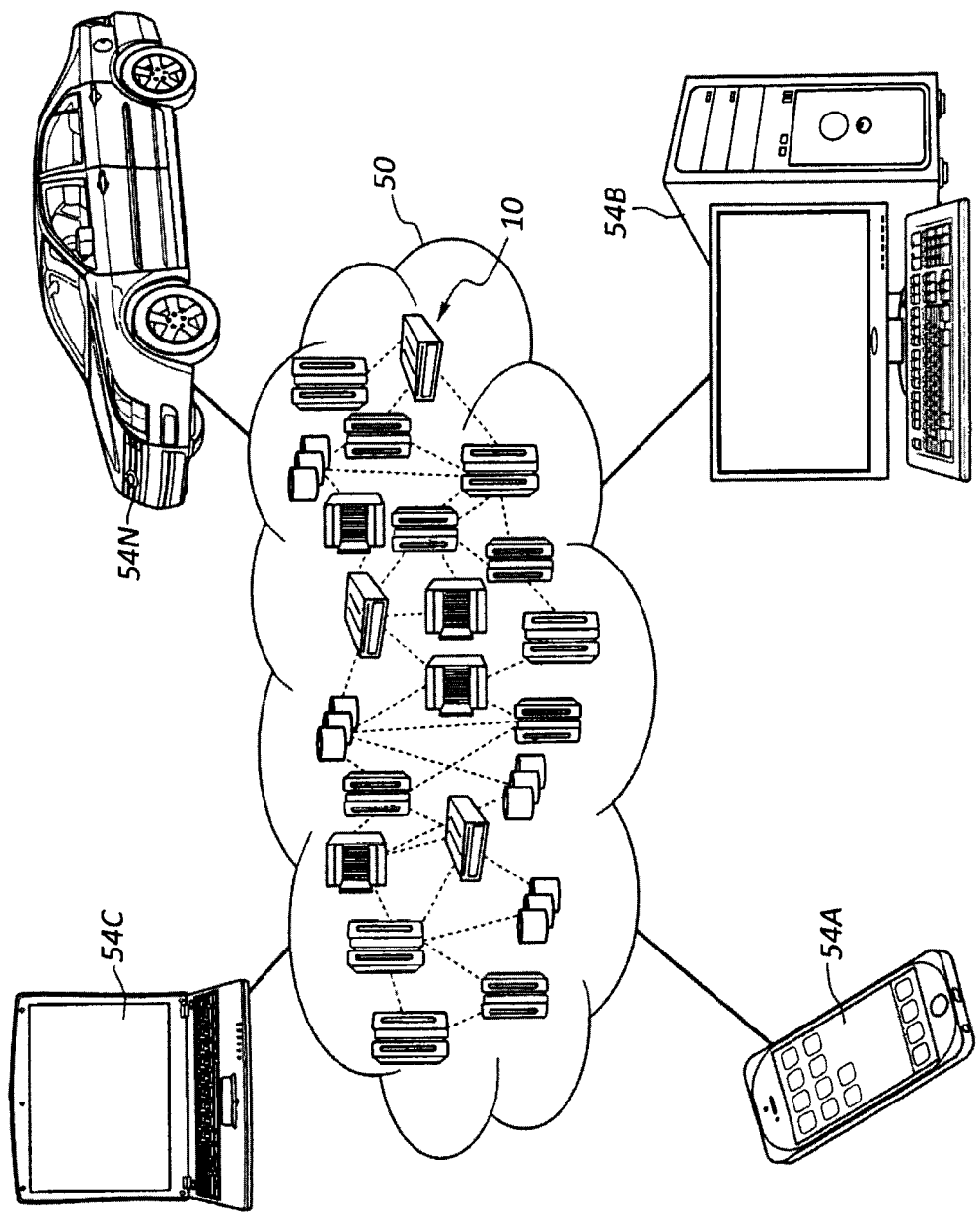
FIG. 7 depicts a cloud computing environment according to one embodiment.
Figure 8:
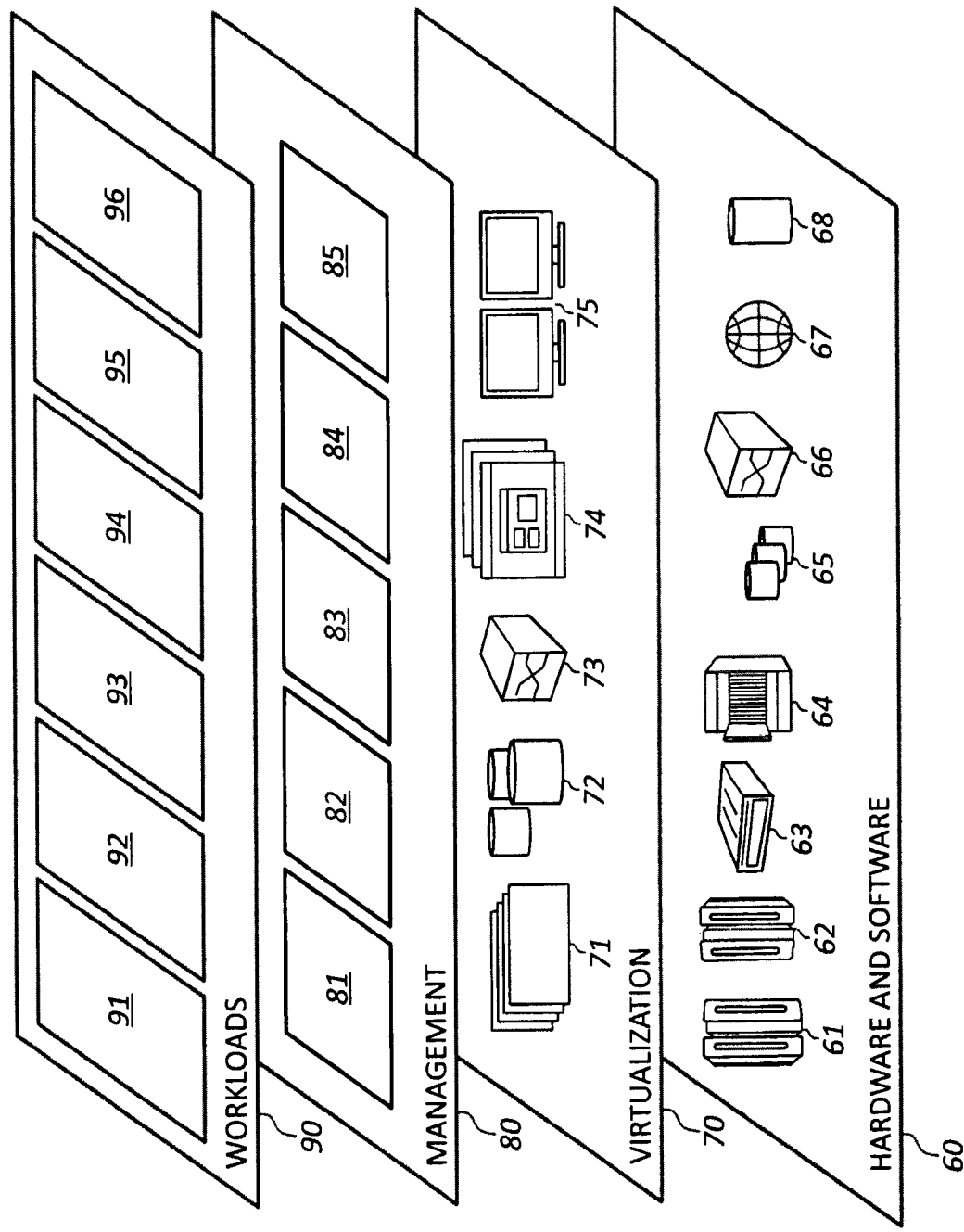
FIG. 8 depicts abstraction model layers according to one embodiment.

FIGS. 6-8 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 6, computer system 12 in computing node 10 is shown in the form of a general-purpose computing device. The components of computer system 12 may include, but are not limited to, one or more processors 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 7-8.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, mobile device 102 can include one or more computing node 10 and can include one or more program 40 for performing functions described with reference to method 200 of FIG. 2. In one embodiment, establishment system 106 can include one or more computing node 10 and can include one or more program 40 for performing functions described with reference to method 250 of FIG. 3. One or more computing node 10 of mobile device 102 can be configured as a cloud computing node or as a computing node of a computing environment that is not a cloud computing environment. One or more computing node 10 of establishment system 106 can be configured as a cloud computing node or as a computing node of a computing environment that is not a cloud computing environment. Mobile device 102 can be provided e.g. by a smartphone, tablet computer, a laptop computer.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor or an audio input device. Computer system 12 can include one or more network adapter 20, e.g. one or more of network interfaces 402, 404, 406 as described in connection with mobile device 102. In FIG. 7 computing node 10 is described as being implemented in a cloud computing environment and accordingly is referred to as a cloud computing node in the context of FIG. 7.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for mobile device identification, e.g. associating a first mobile device fingerprint to an identifier, associating second mobile device identifier to a MAC address and/or associating a MAC address to an identifier, as described herein. The processing components 96 can be understood as one or more program 40 described in FIG. 6.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer program product comprising:
  a non-transitory computer readable storage medium readable by one or more processing circuit and storing instructions for execution by one or more processors for performing a method comprising:
    receiving a plurality of first fingerprints from a plurality of mobile devices, each of the first fingerprints being associated with an identifier of a user of one of the mobile devices;
    receiving a plurality of second fingerprints from the mobile devices, one of the second fingerprints being associated with a MAC address;
    identifying a match between one of the first fingerprints and the one of the second fingerprints; and
    associating data received from one of the mobile devices to the identifier associated with the one of the first fingerprints.

2. The computer program product of claim 1, wherein the data is associated with the MAC address.

3. The computer program product of claim 1, wherein the data is for use in performing triangulation positioning.

4. The computer program product of claim 1, wherein the data is for use in positioning, and wherein the method includes sending the one of the mobile devices a message using the identifier associated with the one of the first fingerprints based on a current position of the one of the mobile devices.

5. The computer program product of claim 1, wherein the data is for use in performing positioning, and wherein the method includes sending the one of the mobile devices a message using the identifier associated with the one of the first fingerprints based on a traveled path of the one of the mobile devices.

6. The computer program product of claim 1, wherein the first fingerprints and identifiers are formatted as message payload data, wherein the second fingerprints are formatted as message payload data, and wherein the MAC address is formatted as message frame data.

7. The computer program product of claim 1, wherein the method includes monitoring a connection node for received MAC addresses, identifying a recorded identifier of a data repository associated with a received MAC address, and sending a message responsive to the identifying.

8. The computer program product of claim 1, wherein the associating includes determining that the first mobile device fingerprint and the second mobile device fingerprint have each been generated by the one of the mobile devices.

9. A computer program product comprising:
  a non-transitory computer readable storage medium readable by one or more processing circuits and storing instructions for execution by one or more processor for performing a method comprising:
    receiving a first mobile device fingerprint of a mobile device and an identifier associated to the first mobile device fingerprint;
    receiving a second mobile device fingerprint of the mobile device and a MAC address associated to the second mobile device fingerprint;
    determining that the first mobile device fingerprint and the second mobile device fingerprint have each been generated by the mobile device;
    receiving data from the mobile device;
    associating the data received from the mobile device to the identifier based on the determining that the first mobile device fingerprint and the second mobile device fingerprint have each been generated by the mobile device;
    receiving a plurality of first fingerprints from a plurality of mobile devices, the first mobile device fingerprint included among the first fingerprints, the first fingerprints being associated to respective identifiers of users of different ones of a plurality of mobile devices;
    receiving a plurality of second fingerprints respectively from a plurality of mobile devices, the second mobile device fingerprint included among the plurality of second fingerprints; and identifying a match between a fingerprint of the first fingerprints and a fingerprint of the second fingerprints.

10. The computer program product of claim 9, wherein the data received includes position data indicating a location of the mobile device over time, the location of the mobile device over time defining a path of the mobile device.

11. The computer program product of claim 9, wherein the data received includes position data indicating a location of the mobile device over time, and wherein the location of the mobile device over time defines a path of the mobile device.

12. The computer program product of claim 9, wherein the receiving a first mobile device fingerprint of a mobile device and an identifier associated to the first mobile device fingerprint includes receiving a message having each of the first mobile device fingerprint and the identifier formatted as payload data of the message, and wherein the receiving the second mobile device fingerprint of the mobile device and a MAC address associated to the second mobile device fingerprint includes receiving a received message having the second mobile device fingerprint formatted as payload data of the received message and the MAC address formatted as frame data of the received message.

* * * * *